(12) United States Patent
Thyagarajan et al.

(10) Patent No.: US 7,136,534 B2
(45) Date of Patent: Nov. 14, 2006

(54) QUALITY BASED IMAGE COMPRESSION

(75) Inventors: Kadayam S. Thyagarajan, San Diego, CA (US); Steven A. Morley, Escondido, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 10/461,985

(22) Filed: Jun. 12, 2003

(65) Prior Publication Data

US 2003/0202707 A1   Oct. 30, 2003

Related U.S. Application Data

(63) Continuation of application No. 09/494,192, filed on Jan. 28, 2000, now Pat. No. 6,600,836.

(51) Int. Cl.
   G06K 9/36    (2006.01)
   H04N 1/32    (2006.01)

(52) U.S. Cl. ............... 382/239; 382/240; 358/426.04

(58) Field of Classification Search ......... 382/239, 382/240, 248, 232, 283; 358/433, 261.2, 358/426.01, 426.4; 375/240.02, 240.11, 375/240.2, 240.24
   See application file for complete search history.

(56) References Cited

U.S. PATENT DOCUMENTS

| | | | | |
|---|---|---|---|---|
| 5,038,389 A | * | 8/1991 | Mizuno | 382/248 |
| 5,412,484 A | * | 5/1995 | Yoshikawa | 382/246 |
| 5,452,104 A | * | 9/1995 | Lee | 358/426.14 |
| 5,691,770 A | * | 11/1997 | Keesman et al. | 375/240.04 |
| 5,699,475 A | * | 12/1997 | Oguro et al. | 386/109 |
| 5,721,589 A | * | 2/1998 | Murata | 375/240.18 |

OTHER PUBLICATIONS

"Adaptive block-size transform coding for image compression," Javier Bracamonte et al., 1997 IEEE International Conference o Acoustics, Speech, and Signal Processing, 1997, ICASSP-97, vol. 4, 1997, pp. 2721-2724.*
"A fully adaptive DCT based color image sequence coder", Chen, Rong-Jian et al., Signal Processing Image Communication, vol. 6, No. 4, Aug. 1, 1994, pp. 289-301.*
"Image compression with variable block size segmentation," Vaisey J. et al., IEEE Transactions on Signal Processing, vol. 40 No. 8, Aug. 1, 1992, pp. 2040-2060.*

* cited by examiner

*Primary Examiner*—Wenpeng Chen
(74) *Attorney, Agent, or Firm*—Philip R. Wadsworth; Sandip S. Minhas; Milan Patel

(57) ABSTRACT

A system and method for quality-based image compression utilizing adaptively sized blocks and sub-blocks of discrete cosine transform coefficient data and a quality based quantization scale factor is claimed. A block size assignment element in an encoder element selects the block or sub-block of an input block of pixel data to be processed. Blocks with variances larger than a threshold are subdivided, while blocks with variances smaller than a threshold are not subdivided. A transform element transforms the pixel values of the selected blocks into the frequency domain. The frequency domain values are quantized either on a block by block basis or a frame by frame basis utilizing a scale factor that correlates with the quality of the image. The data is then serialized and coded in preparation for transmission.

51 Claims, 8 Drawing Sheets

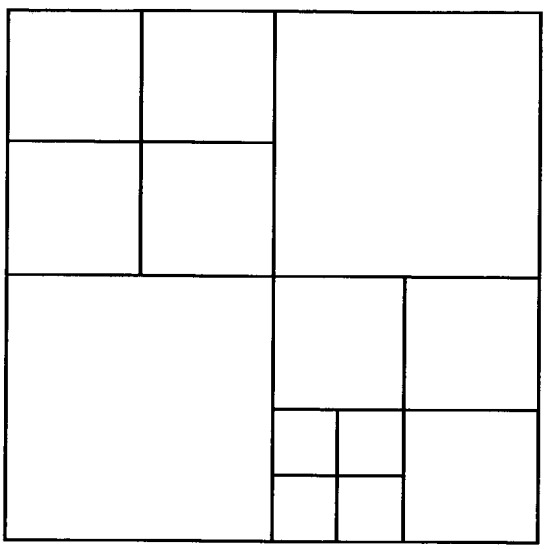
FIG. 4A
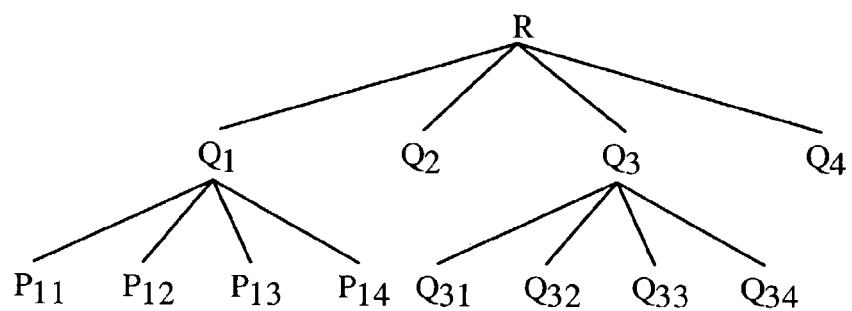
FIG. 4B
| R | $Q_1$ | $Q_2$ | $Q_3$ | $Q_4$ | $P_1$ | $P_2$ | $P_3$ | $P_4$ | $P_9$ | $P_{10}$ | $P_{11}$ | $P_{12}$ |
|---|---|---|---|---|---|---|---|---|---|---|---|---|
| 1 | 1 | 0 | 1 | 0 | 0 | 0 | 0 | 0 | 0 | 0 | 1 | 0 |
PQR DATA
FIG. 4C

QUALITY BASED IMAGE COMPRESSION

CROSS-REFERENCE TO RELATED APPLICATION

This application is a continuation of U.S. patent application Ser. No. 09/494,192, filed on Jan. 28, 2000, now U.S. Pat. No. 6,600,836 which application is incorporated herein by reference in its entirety.

BACKGROUND OF THE INVENTION

I. Field of the Invention

The present invention relates to image processing. More specifically, the present invention relates to a quality based compression scheme for image signals utilizing adaptively sized blocks and sub-blocks of encoded discrete cosine transform coefficient data.

II. Description of the Related Art

In the field of transmission and reception of video signals such as are used for projecting "films" or "movies", various improvements are being made to image compression techniques. Many of the current and proposed video systems make use of digital encoding techniques. Digital encoding provides a robustness for the communications link which resists impairments such as multipath fading and jamming or signal interference, each of which could otherwise seriously degrade image quality. Furthermore, digital techniques facilitate the use signal encryption techniques, which are found useful or even necessary for governmental and many newly developing commercial broadcast applications.

High definition video is an area which benefits from improved image compression techniques. When first proposed, over-the-air transmission of high definition video (or even over-wire or fiber-optical transmission) seemed impractical due to excessive bandwidth requirements. Typical wireless, or other, transmission systems being designed did not readily accommodate enough bandwidth. However, it has been realized that compression of digital video signals may be achieved to a level that enables transmission using reasonable bandwidths. Such levels of signal compression, coupled with digital transmission of the signal, may enable a video system to transmit with less power and with greater immunity to channel impairments while occupying a more desirable and useful bandwidth.

Many compression techniques available offer significant levels of compression, but result in a degradation of the quality of the video signal. Typically, techniques for transferring compressed information require the compressed information to be transferred at a constant bit rate.

One compression technique capable of offering significant levels of compression while preserving the desired level of quality for video signals utilizes adaptively sized blocks and sub-blocks of encoded Discrete Cosine Transform (DCT) coefficient data. This technique will hereinafter be referred to as the Adaptive Block Size Discrete Cosine Transform (ABSDCT) method. This technique is disclosed in U.S. Pat. No. 5,021,891, entitled "Adaptive Block Size Image Compression Method And System," assigned to the assignee of the present invention and incorporated herein by reference. DCT techniques are also disclosed in U.S. Pat. No. 5,107,345, entitled "Adaptive Block Size Image Compression Method And System," assigned to the assignee of the present invention and incorporated herein by reference. Further, the use of the ABSDCT technique in combination with a Differential Quadtree Transform technique is discussed in U.S. Pat. No. 5,452,104, entitled "Adaptive Block Size Image Compression Method And System," also assigned to the assignee of the present invention and incorporated herein by reference. The systems disclosed in these patents utilize what is referred to as "intra-frame" encoding, where each frame of image data is encoded without regard to the content of any other frame. Using the ABSDCT technique, the achievable data rate may be reduced from around 1.5 billion bits per second to approximately 50 million bits per second without discernible degradation of the image quality.

The ABSDCT technique may be used to compress either a black and white or a color image or signal representing the image. The color input signal may be in a YIQ format, with Y being the luminance, or brightness, sample, and I and Q being the chrominance, or color, samples for each 4×4 block of pixels. Other known formats such as the YUV, $YC_bC_y$, or RGB formats may also be used. Because of the low spatial sensitivity of the eye to color, most research has shown that a sub-sample of the color components by a factor of four in the horizontal and vertical directions is reasonable. Accordingly, a video signal may be represented by four luminance components and two chrominance components.

Using ABSDCT, a video signal will generally be segmented into blocks of pixels for processing. For each block, the luminance and chrominance components are passed to a block interleaver. For example, a 16×16 (pixel) block may be presented to the block interleaver, which orders or organizes the image samples within each 16×16 block to produce blocks and composite sub-blocks of data for discrete cosine transform (DCT) analysis. The DCT operator is one method of converting a time and spatial sampled signal to a frequency representation of the same signal. By converting to a frequency representation, the DCT techniques have been shown to allow for very high levels of compression, as quantizers can be designed to take advantage of the frequency distribution characteristics of an image. In a preferred embodiment, one 16×16 DCT is applied to a first ordering, four 8×8 DCTs are applied to a second ordering, 16 4×4 DCTs are applied to a third ordering, and 64 2×2 DCTs are applied to a fourth ordering.

The DCT operation reduces the spatial redundancy inherent in the video source. After the DCT is performed, most of the video signal energy tends to be concentrated in a few DCT coefficients. An additional transform, the Differential Quad-Tree Transform (DQT), may be used to reduce the redundancy among the DCT coefficients.

For the 16×16 block and each sub-block, the DCT coefficient values and the DQT value (if the DQT is used) are analyzed to determine the number of bits required to encode the block or sub-block. Then, the block or the combination of sub-blocks that requires the least number of bits to encode is chosen to represent the image segment. For example, two 8×8 sub-blocks, six 4×4 sub-blocks, and eight 2×2 sub-blocks may be chosen to represent the image segment.

The chosen block or combination of sub-blocks is then properly arranged in order into a 16×16 block. The DCT/DQT coefficient values may then undergo frequency weighting, quantization, and coding (such as variable length coding) in preparation for transmission. Although the ABSDCT technique described above performs remarkably well, it is computationally intensive. Thus, compact hardware implementation of the technique may be difficult.

SUMMARY OF THE INVENTION

Alternative techniques that make hardware implementation more efficient offer certain advantages. Some systems utilize adaptively sized blocks and sub-blocks of Discrete Cosine Transform (DCT) coefficient data. Although portions of DCT based systems utilize quality as a compression parameter, other portions of the data are based on the encoding rate, as opposed to using a quality-based metric. An example of such a coding rate based paramter is the quantization step selection of the contrast based adaptive block size image compression algorithm.

The present invention is a quality based system and method of image compression that utilizes adaptively sized blocks and sub-blocks of Discrete Cosine Transform coefficient data and a quality based quantization scale factor. A block of pixel data is input to an encoder. The encoder comprises a block size assignment (BSA) element, which segments the input block of pixels for processing. The block size assignment is based on the variances of the input block and further subdivided blocks. In general, areas with larger variances are subdivided into smaller blocks, and areas with smaller variances are not be subdivided, provided the block and sub-block mean values fall into different predetermined ranges. Thus, first the variance threshold of a block is modified from its nominal value depending on its mean value, and then the variance of the block is compared with a threshold, and if the variance is greater than the threshold, then the block is subdivided.

The block size assignment is provided to a transform element, which transforms the pixel data into frequency domain data. The transform is performed only on the block and sub-blocks selected through block size assignment. The transform data then undergoes scaling through quantization and serialization. Quantization of the transform data is quantized based on an image quality metric, such as a scale factor that adjusts with respect to contrast, coefficient count, rate distortion, density of the block size assignments, and/or past scale factors. Zigzag scanning may also be utilized to serialize the data to produce a stream of data. The stream of data may be coded by a variable length coder in preparation of transmission. The encoded data is sent through a transmission channel to a decoder, where the pixel data is reconstructed in preparation for display.

It is a feature and advantage of the invention to provide a quality based image compression system.

It is another feature and advantage of the invention to allow flexible image quality control through management of the bit rate on a frame by frame basis.

It is another feature and advantage of the invention to allow flexible image quality control through management of the bit rate on a block by block basis.

It is another feature and advantage of the invention to maintain quality image compression and bit rate control of data accompanying activities such as bursts of motion.

It is another feature and advantage of the invention to use signal to noise ratio parameters to quantify image quality.

It is another feature and advantage of the invention to utilize a quantization scale factor that adjusts with respect to the contrast of the image.

It is another feature and advantage of the invention to utilize a quantization scale factor that adjusts with respect to the AC coefficient count of the DCT blocks that comprise an image.

It is another feature and advantage of the invention to utilize a quantization scale factor that adjusts with respect to the distortion and bit rate between frames.

It is another feature and advantage of the invention to utilize a quantization scale factor that adjusts with respect to past quantization scale factors.

BRIEF DESCRIPTION OF THE DRAWINGS

The features and advantages of the present invention will become more apparent from the detailed description set forth below when taken in conjunction with the drawings in which like reference characters identify correspondingly throughout and wherein:

FIGS. 4a, 4b, and 4c illustrate an exemplary, block size assignment, the corresponding quad-tree decomposition, and the corresponding PQR data.

FIG. 7b is a continuation of the flow chart of the quantizer scale factor based on rate distortion in FIG. 7a.

DETAILED DESCRIPTION OF THE PREFERRED EMBODIMENTS

Figure 1:
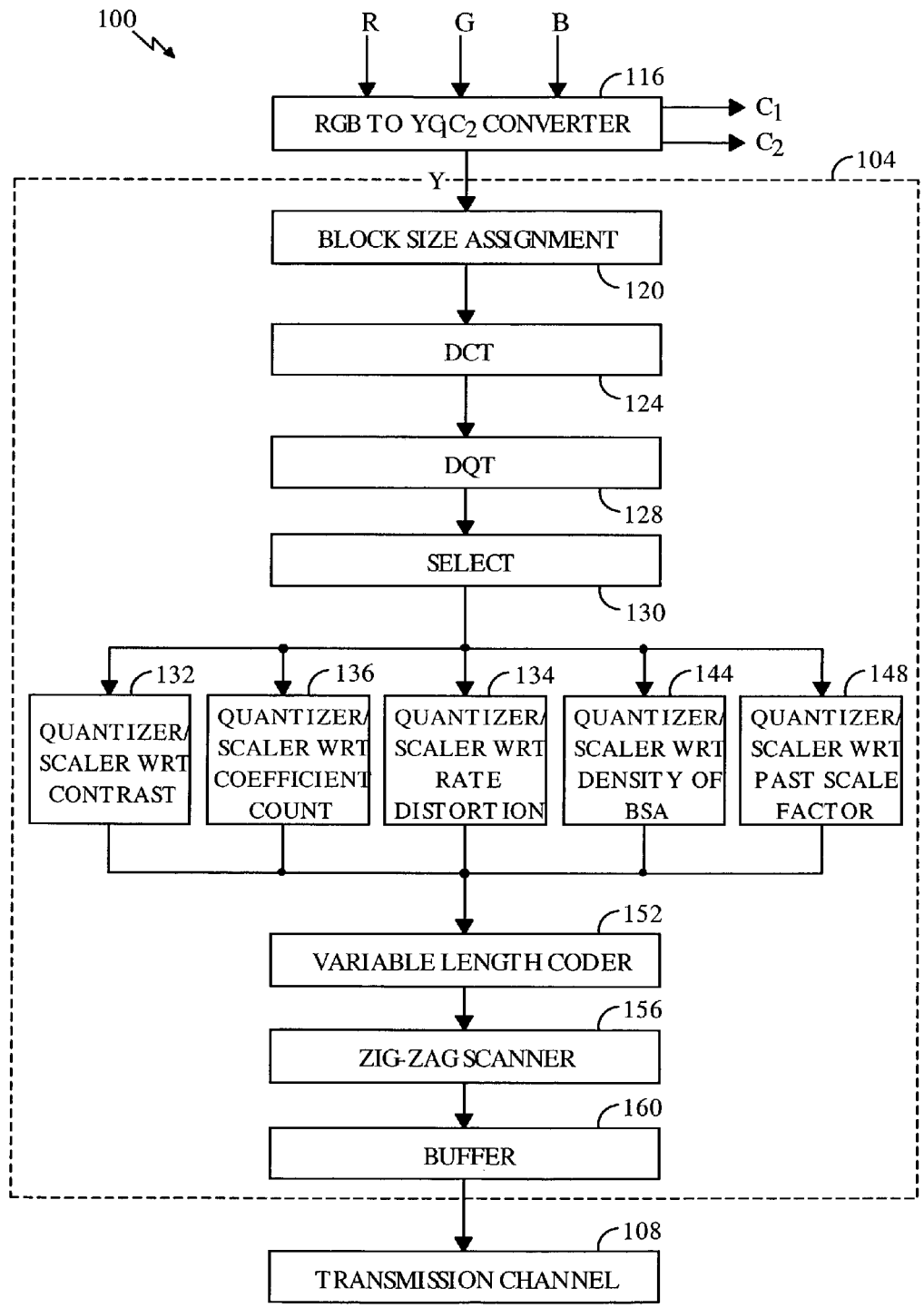
FIG. 1 is a block diagram of an encoder portion of a quality based image processing system incorporating the variance based block size assignment system and method of the present invention.

In order to facilitate digital transmission of digital signals and enjoy the corresponding benefits, it is generally necessary to employ some form of signal compression. To achieve high compression in a resulting image, it is also important that high quality of the image be maintained. Furthermore, computational efficiency is desired for compact hardware implementation, which is important in many applications.

The present invention provides a quality based system or apparatus and method of image compression that takes into account both the image quality and computational efficiency in performing image compression. Controlling the bit rate of a truly variable rate system based on the goal of maintaining a target bit rate inhibits the purpose of maintaining a quality image. Instead, the present invention addresses rate control strategies based on quality. Quality-based image compression systems may be on a block level or on a frame level. The block level system generally uses a greater number of encoded bits per frame than frame level control because the block level systems use more overhead bits for identification of the particular blocks.

Before one embodiment of the invention is explained in detail, it is to be understood that the invention is not limited in its application to the details of the construction and the arrangement of the components set forth in the following description or illustrated in the drawings. The invention is capable of other embodiments and are carried out in various ways. Also, it is understood that the phraseology and terminology used herein is for purpose of description and should not be regarded as limiting.

The image compression of the present invention is based on discrete cosine transform (DCT) techniques, such as that disclosed in co-pending U.S. patent application "Contrast Sensitive Variance Based Adaptive Block Size DCT Image Compression", Ser. No. 09/436,085 filed on Nov. 8, 1999, assigned to the assignee of the present invention and incorporated herein by reference. Generally, an image to be processed in the digital domain is composed of pixel data divided into an array of non-overlapping blocks, N×N in size. A two-dimensional DCT may be performed on each block. The two-dimensional DCT is defined by the following relationship:

$$X(k, l) = \frac{\alpha(k)\beta(l)}{\sqrt{N*M}} \sum_{m=0}^{N-1} \sum_{n=0}^{N-1} x(m, n) \cos\left[\frac{(2m+1)\pi k}{2N}\right] \cos\left[\frac{(2n+1)\pi l}{2N}\right], 0 \le k, l \le N-1$$

where $$\alpha(k), \beta(l) = \begin{cases} 1, & \text{if } k = 0 \\ \sqrt{2}, & \text{if } k \ne 0 \end{cases}, \text{ and}$$

x(m,n) is the pixel at location (m,n) within an N×M block, and

X(k,l) is the corresponding DCT coefficient.

Since pixel values are non-negative, the DCT component X(0,0) is always positive and usually has the most energy. In fact, for typical images, most of the transform energy is concentrated around the component X(0,0). This energy compaction property is what makes the DCT technique such an attractive compression method.

The image compression technique utilizes contrast adaptive coding to achieve further bit rate reduction. It has been observed that most natural images are made up of relatively slow varying flat areas, and busy areas such as object boundaries and high-contrast texture. Contrast adaptive coding schemes take advantage of this factor by assigning more bits to the busy areas and less bits to the less busy areas.

As desicribed in the aforementioned pending patent application Ser. No. 09/436,085, contrast adaptive coding is also useful for reducing the blocking effect. The blocking effect tends to be more perceptible in busy areas of the image. However, it has been realized that the blocking effect is reduced when a smaller sized DCT is used. The blocking effect becomes virtually invisible when a 2×2 DCT is used, although the bit per pixel performance may suffer.

Further, contrast adaptive methods utilize intraframe coding (spatial processing) instead of interframe coding (spatio-temporal processing). Interframe coding inherently requires multiple frame buffers in addition to more complex processing circuits. In many applications, reduced complexity is needed for actual implementation. Intraframe coding is also useful in a situation that can make a spatio-temporal coding scheme break down and perform poorly. For example, 24 frame per second movies can fall into this category since the integration time, due to the mechanical shutter, is relatively short. The short integration time allows a higher degree of temporal aliasing. The assumption of frame to frame correlation breaks down for rapid motion as it becomes jerky. Intraframe coding is also easier to standardize when both 50 Hz and 60 Hz power line frequencies are involved. Television currently transmits signals at either 50 Hz or 60 Hz. The use of an intraframe scheme, being a digital approach, can adapt to both 50 Hz and 60 Hz operation, or even to 24 frame per second movies by trading off frame rate versus spatial resolution.

For image processing purposes, the DCT operation is performed on pixel data that is divided into an array of non-overlapping blocks. Note that although block sizes are discussed herein as being N×N in size, it is envisioned that various block sizes may be used. For example, a N×M block size may be utilized where both N and M are integers with M being either greater than or less than N. Another important aspect is that the block is divisible into at least one level of sub-blocks, such as N/i×N/i, N/i×N/j, N/i×M/j, and etc. where i and j are integers. Furthermore, the exemplary block size as discussed herein is a 16×16 pixel block with corresponding block and sub-blocks of DCT coefficients. It is further envisioned that various other integers such as both even or odd integer values may be used, e.g. 9×9.

Figure 2:
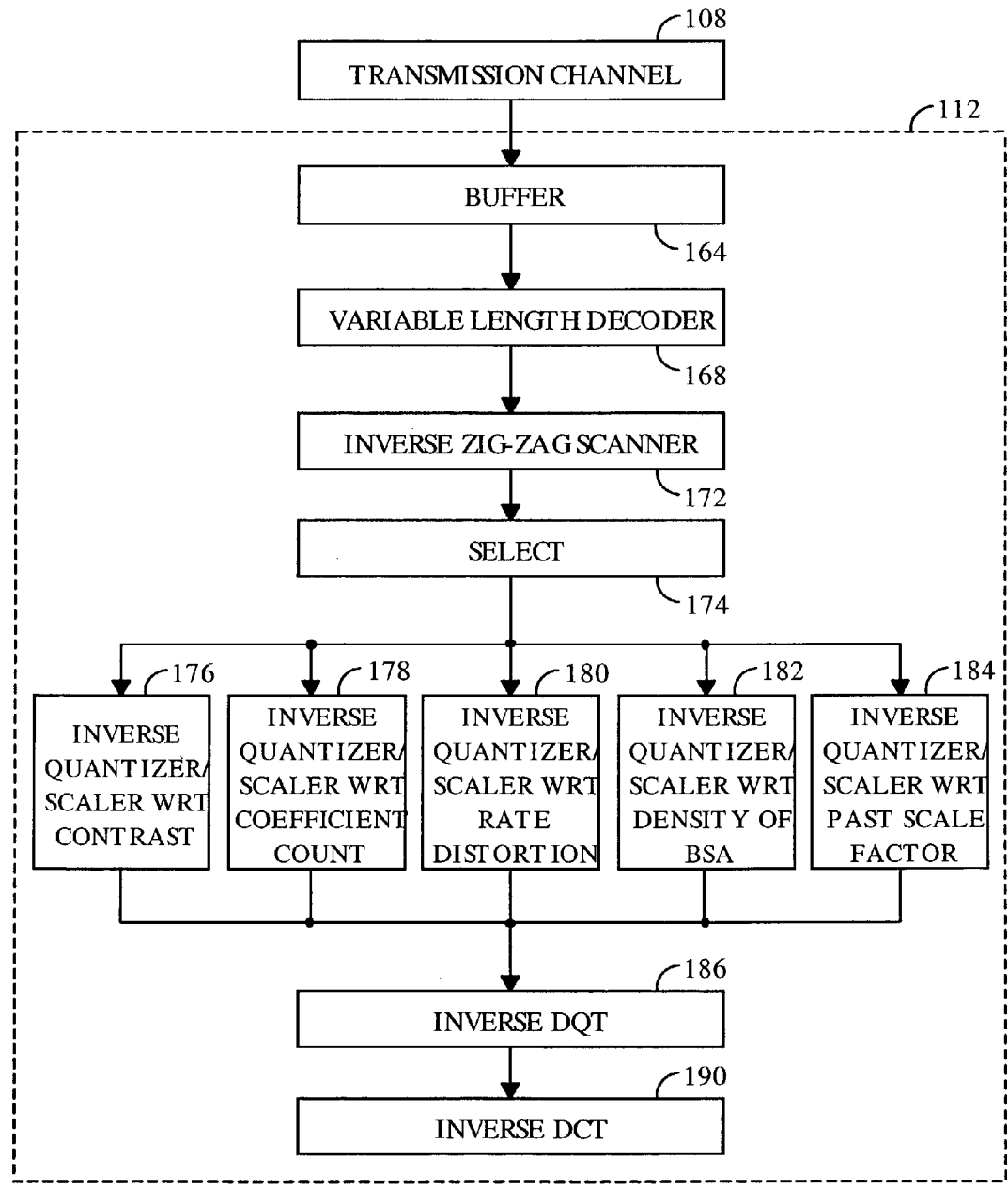
FIG. 2 is a block diagram of a decoder portion of a quality based image processing system incorporating the variance based block size assignment system and method of the present invention.

FIGS. 1 and 2 illustrate an image processing system 100 incorporating the quality based compression system of the present invention. The image processing system 100 comprises an encoder 104 that compresses a received video signal. The compressed signal is transmitted using a transmission channel 108, and received by a decoder 112. The decoder 112 decodes the received signal into image samples, which may then be displayed.

In general, an image is divided into blocks of pixels for processing. A color signal may be converted from RGB space to $YC_1C_2$ space using a RGB to $YC_1C_2$ converter 116, where Y is the luminance, or brightness, component, and $C_1$ and $C_2$ are the chrominance, or color, components. Because of the low spatial sensitivity of the eye to color, many systems sub-sample the $C_1$ and $C_2$ components by a factor of four in the horizontal and vertical directions. However, the sub-sampling is not necessary. A full resolution image, known as 4:4:4 format, may be either very useful or necessary in some applications such as those referred to as covering "digital cinema." Two possible $YC_1C_2$ representations are, the YIQ representation and the YUV representation, both of which are well known in the art. It is also possible to employ a variation of the YUV representation known as YCbCr.

In a preferred embodiment, each of the Y, Cb, and Cr components is processed without sub-sampling. Thus, an input of each component of a 16×16 block of pixels is provided to the encoder 104. For illustration purposes, the encoder 104 for the Y component is illustrated. Similar encoders are used for the Cb, and Cr components. The encoder 104 comprises a block size assignment element 120, which performs block size assignment in preparation for video compression. The block size assignment element 120 determines the block decomposition of the 16×16 block based on the perceptual characteristics of the image in the block. Block size assignment subdivides each 16×16 block into smaller blocks in a quad-tree fashion depending on the activity within a 16×16 block. The block size assignment element 120 generates a quad-tree data, called the PQR data, whose length can be between 1 and 21 bits. Thus, if block size assignment determines that a 16×16 block is to be divided, the R bit of the PQR data is set and is followed by four additional bits of Q data corresponding to the four divided 8×8 blocks. If block size assignment determines that any of the 8×8 blocks is to be subdivided, then four additional bits of P data for each 8×8 block subdivided are added.

Figure 3:
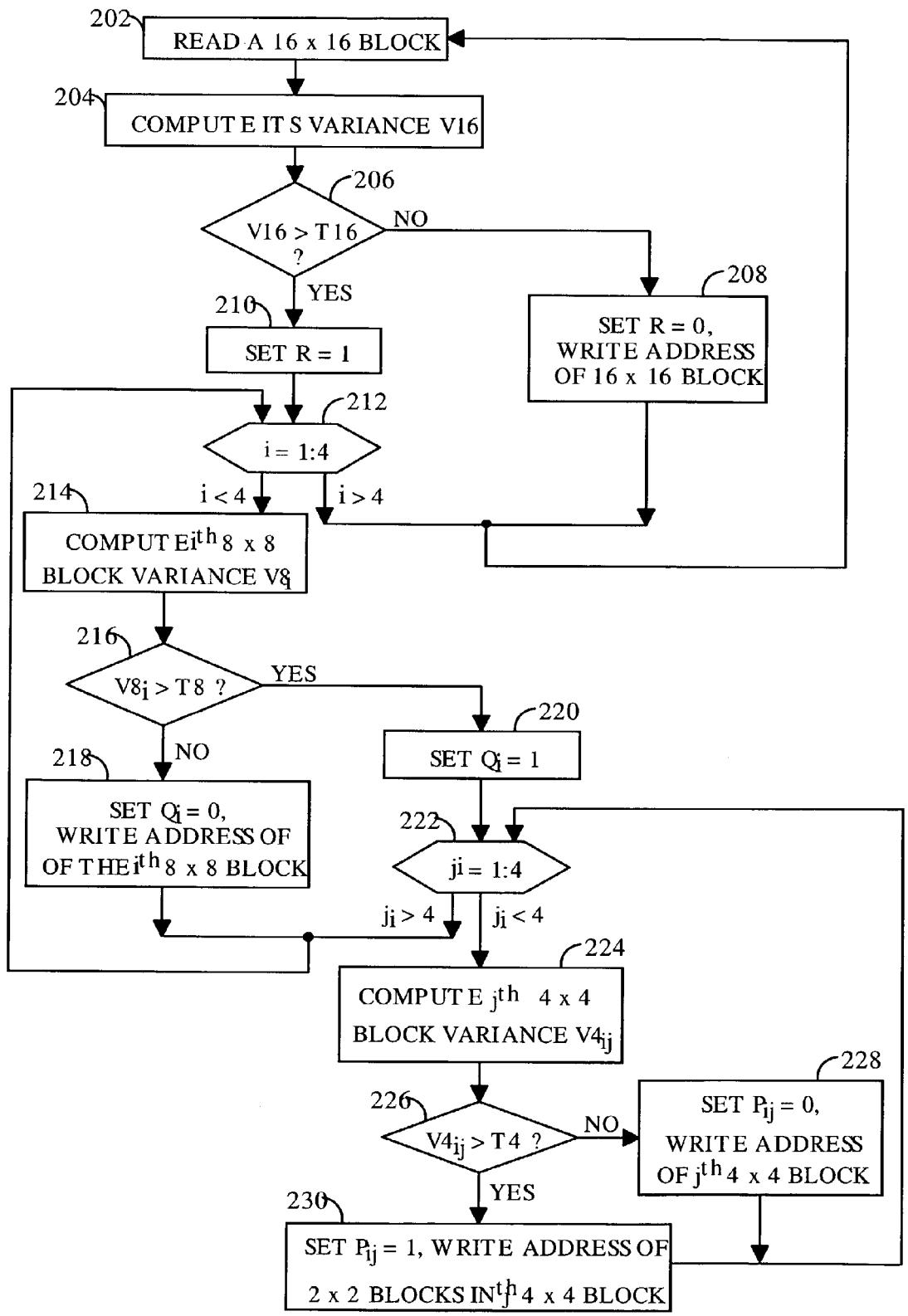
FIG. 3 is a flow diagram illustrating the processing steps involved in variance based block size assignment.

Referring now to FIG. 3, a flow diagram showing details of the operation of the block size assignment element 120 is provided. The variance of a block is used as a metric in the decision to subdivide a block. Beginning at step 202, a 16×16 block of pixels is read. At step 204, the variance, v16, of the 16×16 block is computed. The variance is computed as follows:

$$\text{var} = \frac{1}{N^2}\sum_{i=0}^{N-1}\sum_{j=0}^{N-1} x_{i,j}^2 - \left(\frac{1}{N^2}\sum_{i=0}^{N-1}\sum_{j=0}^{N-1} x_{i,j}\right)^2$$

where N=16, and $x_{ij}$ is the pixel in the $i^{th}$ row, $j^{th}$ column within the N×N block. At step 206, first the variance threshold T16 is modified to provide a new threshold T'16 if the mean value of the block is between two predetermined values, then the block variance is compared against the new threshold, T'16.

If the variance v16 is not greater than the threshold T16, then at step 208, the starting address of the 16×16 block is written into temporary storage, and the R bit of the PQR data is set to 0 to indicate that the 16×16 block is not subdivided. The algorithm then reads the next 16×16 block of pixels. If the variance v16 is greater than the threshold T16, then at step 210, the R bit of the PQR data is set to 1 to indicate that the 16×16 block is to be subdivided into four 8×8 blocks.

The four 8×8 blocks, i=1:4, are considered sequentially for further subdivision, as shown in step 212. For each 8×8 block, the variance, $v8_i$, is computed, at step 214. At step 216, first the variance threshold T8 is modified to provide a new threshold T'8 if the mean value of the block is between two predetermined values, then the block variance is compared to this new threshold.

If the variance $v8_i$ is not greater than the threshold T8, then at step 218, the starting address of the 8×8 block is written into temporary storage, and the corresponding Q bit, $Q_i$, is set to 0. The next 8×8 block is then processed. If the variance $v8_i$ is greater than the threshold T8, then at step 220, the corresponding Q bit, $Q_i$, is set to 1 to indicate that the 8×8 block is to be subdivided into four 4×4 blocks.

The four 4×4 blocks, $j_i$=1:4, are considered sequentially for further subdivision, as shown in step 222. For each 4×4 block, the variance, $v4_{ij}$, is computed, at step 224. At step 226, first the variance threshold T4 is modified to provide a new threshold T'4 if the mean value of the block is between two predetermined values, then the block variance is compared to this new threshold.

If the variance $v4_{ij}$ is not greater than the threshold T4, then at step 228, the address of the 4×4 block is written, and the corresponding P bit, $P_{ij}$, is set to 0. The next 4×4 block is then processed. If the variance $v4_{ij}$ is greater than the threshold T4, then at step 230, the corresponding P bit, $P_{ij}$, is set to 1 to indicate that the 4×4 block is to be subdivided into four 2×2 blocks. In addition, the address of the 4 2×2 blocks are written into temporary storage.

The thresholds T16, T8, and T4 may be predetermined constants. This is known as the hard decision. Alternatively, an adaptive or soft decision may be implemented. For example, the soft decision varies the thresholds for the variances depending on the mean pixel value of the 2N×2N blocks, where N can be 8, 4, or 2. Thus, functions of the mean pixel values, may be used as the thresholds.

For purposes of illustration, consider the following example. Let the predetermined variance thresholds for the Y component be 50, 1100, and 880 for the 16×16, 8×8, and 4×4 blocks, respectively. In other words, T16=50, T8=1100, and T4=880. Let the range of mean values be 80 and 100. Suppose the computed variance for the 16×16 block is 60. Since 60 is greater than T16, and the mean value 90 is between 80 and 100, the 16×16 block is subdivided into four 8×8 sub-blocks. Suppose the computed variances for the 8×8 blocks are 1180, 935, 980, and 1210. Since two of the 8×8 blocks have variances that exceed T8, these two blocks are further subdivided to produce a total of eight 4×4 sub-blocks. Finally, suppose the variances of the eight 4×4 blocks are 620, 630, 670, 610, 590, 525, 930, and 690, with corresponding means values 90, 120, 110, 115. Since the mean value of the first 4×4 block falls in the range (80, 100), its threshold will be lowered to T'4=200 which is less than 880. So, this 4×4 block will be subdivided as well as the seventh 4×4 block. The resulting block size assignment is shown in FIG. 4a. The corresponding quad-tree decomposition is shown in FIG. 4b. Additionally, the PQR data generated by this block size assignment is shown in FIG. 4c.

Note that a similar procedure is used to assign block sizes for the color components $C_1$ and $C_2$. The color components may be decimated horizontally, vertically, or both.

Additionally, note that although block size assignment has been described as a top down approach, in which the largest block (16×16 in the present example) is evaluated first, a bottom up approach may instead be used. The bottom up approach will evaluate the smallest blocks (2×2 in the present example) first.

Referring back to FIG. 1, the PQR data, along with the addresses of the selected blocks, are provided to a DCT element 124. The DCT element 124 uses the PQR data to perform discrete cosine transforms of the appropriate sizes on the selected blocks. Only the selected blocks need to undergo DCT processing.

The image processing system 100 may optionally comprise DQT element 128 for reducing the redundancy among the DC coefficients of the DCTs. A DC coefficient is encountered at the top left corner of each DCT block. The DC coefficients are, in general, large compared to the AC coefficients. The discrepancy in sizes makes it difficult to design an efficient variable length coder. Accordingly, it is advantageous to reduce the redundancy among the DC coefficients.

The DQT element 128 performs 2-D DCTs on the DC coefficients, taken 2×2 at a time. Starting with 2×2 blocks within 4×4 blocks, a 2-D DCT is performed on the four DC coefficients. This 2×2 DCT is called the differential quad-tree transform, or DQT, of the four DC coefficients. Next, the DC coefficient of the DQT along with the three neighboring DC coefficients within an 8×8 block are used to compute the next level DQT. Finally, the DC coefficients of the four 8×8 blocks within a 16×16 block are used to compute the DQT. Thus, in a 16×16 block, there is one true DC coefficient and the rest are AC coefficients corresponding to the DCT and DQT.

The transform coefficients (both DCT and DQT) are provided to a quantizer for quantization. In a preferred embodiment, the DCT coefficients are quantized using frequency weighting masks (FWMs) and a quantization scale factor. A FWM is a table of frequency weights of the same dimensions as the block of input DCT coefficients. The frequency weights apply different weights to the different DCT coefficients. The weights are designed to emphasize the input samples having frequency content that the human visual or optical system is more sensitive to, and to de-emphasize samples having frequency content that the visual or optical system is less sensitive to. The weights may also be designed based on factors such as viewing distances, etc.

The weights are selected based on empirical data. A method for designing the weighting masks for 8×8 DCT coefficients is disclosed in ISO/IEC JTC1 CD 10918, "Digital compression and encoding of continuous-tone still images—part 1: Requirements and guidelines," International Standards Organization, 1994, which is incorporated herein by reference. In general, two FWMs are designed, one for the luminance component and one for the chrominance components. The FWM tables for block sizes 2×2, 4×4 are obtained by decimation and 16×16 by interpolation of that for the 8×8 block. The scale factor controls the quality and bit rate of the quantized coefficients.

Thus, each DCT coefficient is quantized according to the relationship:

$$DCT_q(i, j) = \left\lfloor \frac{8 * DCT(i, j)}{fwm(i, j) * q} \pm \frac{1}{2} \right\rfloor$$

where DCT(i,j) is the input DCT coefficient, fwm(i,j) is the frequency weighting mask, q is the scale factor, and DCTq(i,j) is the quantized coefficient. Note that depending on the sign of the DCT coefficient, the first term inside the braces is rounded up or down. The DQT coefficients are also quantized using a suitable weighting mask. However, multiple tables or masks can be used, and applied to each of the Y, Cb, and Cr componants.

The block of pixel data and frequency weighting masks are then scaled by a quantization scale factor element. In a preferred embodiment, there are 32 scale factors corresponding to average bit rates. Unlike other compression methods such as MPEG2, the average bit rate is controlled based on the quality of the processed image, instead of target bit rate and buffer status. In a preferred embodiment, the particular quantization scale element is preselected by a selector 130. Although, it should be noted that the invention does not require that the quantization scale element be preselected.

In one block based embodiment, the quantization scale factor is based on contrast (132). It has been found that the human visual system is more sensitive to high contrast areas than it is to low contrast areas. The quantization scale factor based on contrast uses a predetermined relationship between bit rate and the quantizer scale factor. In an embodiment, the BSA function divides a M×N block into sub-blocks based on contrast such that more subdivisions occur in high contrast blocks and fewer subdivisions occur in low contrast blocks. The invention quantifies contrast as the ratio of the square root of the variance to the average intensity. Specifically, a quantization scale factor is chosen according to the BSA as given by the following relationship:

$$R_i = R + \frac{1}{2} \log_2 \left\{ \frac{\sigma_i^2}{\prod_{k=1}^{4} (\sigma_k^2)^{p_k}} \right\}, \ 1 \leq i \leq 4$$

where $R_i$ is the number of bits for the $i^{th}$ type of block, $\sigma_i^2$ is the variance of the $i^{th}$ type of block, and $p_i$ is the percentage of the $i^{th}$ type of block as obtained form the block size assignment function. The quantization scale factor is determined using a predetermined relationship between the bit rate and the quantizer scale factor.

Figure 5:
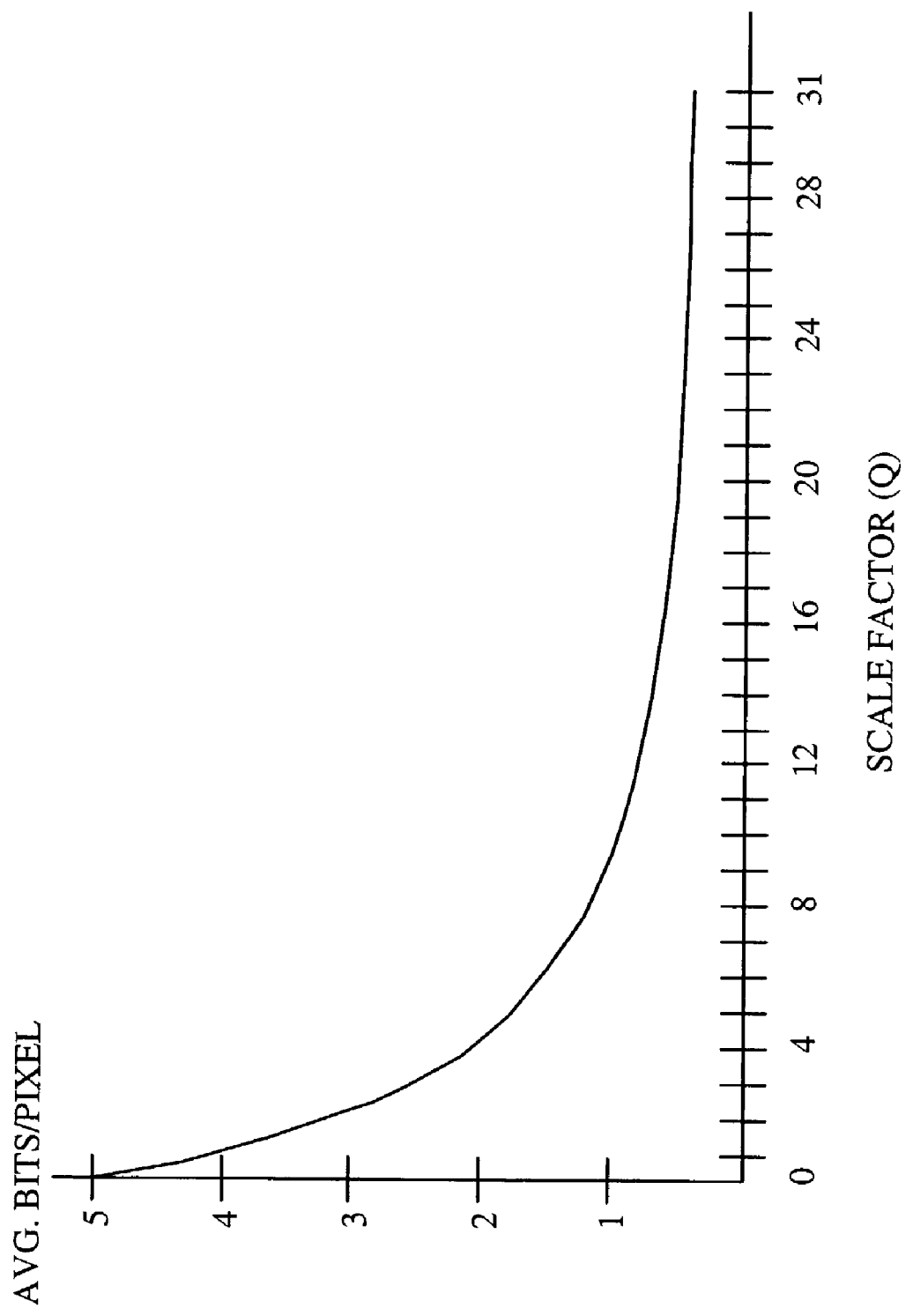
FIG. 5 is a graph illustrating the relationship of the quantizer scale factor vs. the average bits per pixel rate.

The relationship between bit rate and the quantizer scale factor is illustrated in FIG. 5. The relationship between the bit rate and the quantizer scale factor is pre-determined by evaluating a group of images to determine the average number of bits necessary to describe a pixel. As shown, the quantizer scale factor increases as the average number of bits per pixel decreases. Thus, a specific scale factor Q may be chosen for a corresponding value of $R_i$.

Figure 6:
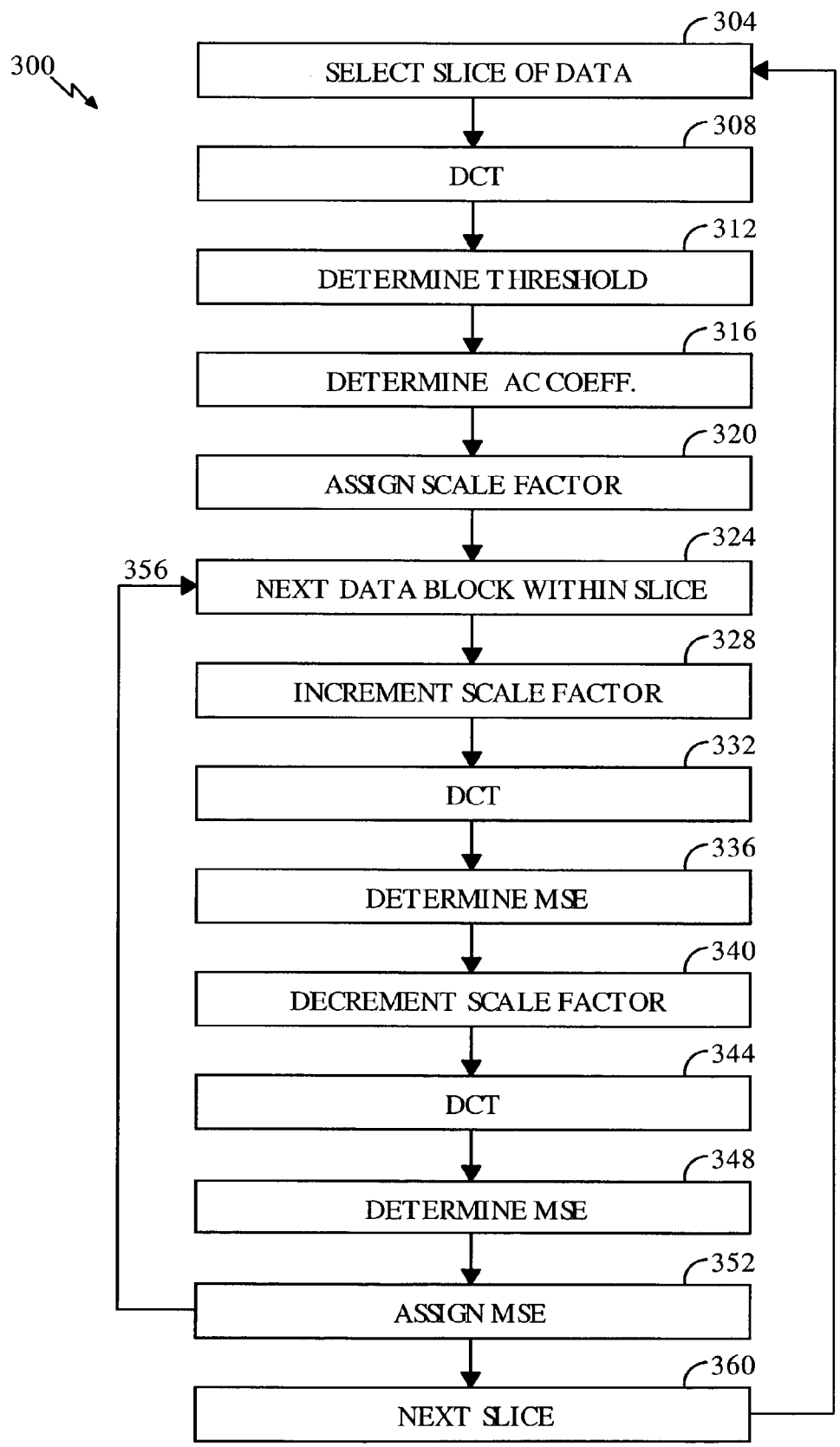
FIG. 6 is a flow chart of a quantizer scale factor based on an AC coefficient count of DCT blocks.

In another block based embodiment, a quantizer scale factor is chosen based on the coefficient count of the DCT (136). Typically, the coefficient count system and method requires one bit per block of overhead. A quantizer scale factor method 300 is illustrated in FIG. 6. After the block size assignment, a slice of data comprising N×N blocks of data is selected (304). In a preferred embodiment, the slice of data comprises blocks of 16 rows by 16 columns of pixel data. A DCT is performed on the block of data (308), and further sub-blocks may be designated, as described in reference to FIG. 3. A threshold for each block of data is determined (312). The threshold may be determined at any stage of the process. In a preferred embodiment, the threshold is empirically predetermined. Then, the number of AC coefficients that exceed in magnitude the predetermined threshold is determined by the following relationship (316):

$$M = \sum_{k=0, l=0}^{N-1} \sum_{k \neq 0, l \neq 0}^{N-1} \{|X(k, l)|/||X(k, l)| > T\}$$

where T is threshold, X(k,l) represents the DCT coefficient at location (k,l) within an N×N block, and M is the number of AC coefficients within an N×N block of DCT that exceed the threshold. A scale factor is then assigned (320) according to the number of AC coefficients exceeding the threshold T.

After the first block of data within a slice is evaluated and assigned a scale factor, the next block of N×N data within the slice is selected (324). The scale factor is incremented (328), and another DCT is performed (332). A mean square error (MSE) is determined between the old and new DCTs (336). The scale factor is then decremented (340), and another DCT is performed (344). The mean square error (MSE) is again determined between the old and new DCTs (348). The two mean square errors are compared, and the quantizer factor associated with the lower mean square error is assigned to the block of data (352). Then, the cycle repeats for each block of data within the slice (356). After a quantizer is assigned for each block of data within a slice, the next slice of data is selected and the cycle continues (360).

Figure 7A:
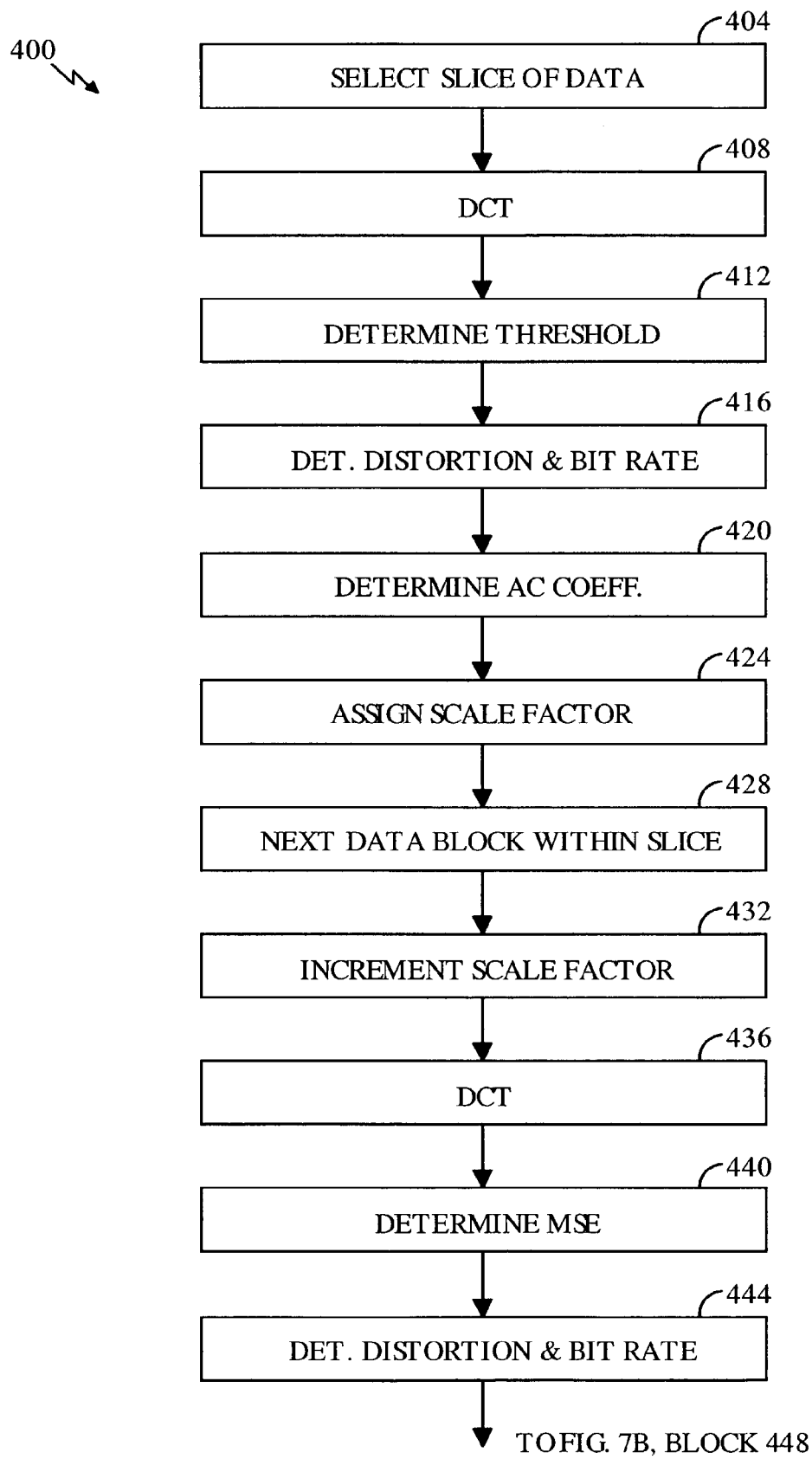
FIG. 7a is a flow chart of a quantizer scale factor based on rate distortion.
Figure 7B:
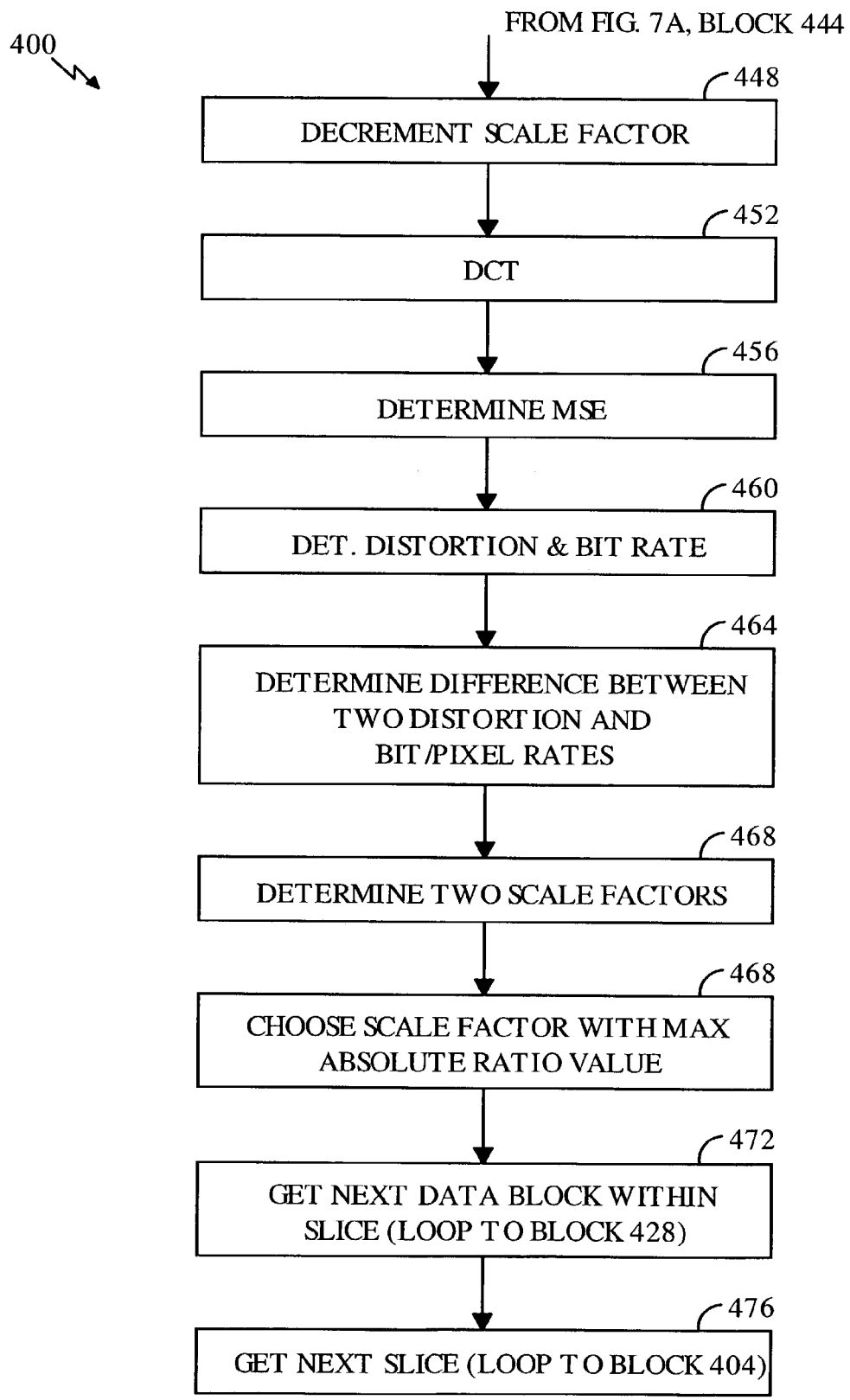

Another block based embodiment of determining the quantizer scale factor is a quantizer scaler based on rate distortion (134), and is illustrated in FIG. 7 (400). Generally, the rate distortion quantizer operates in a similar manner to the coefficient count quantizer, but requires more overhead bits depending upon how many scale factors are scrutinized. After the block size assignment, a slice of data comprising N×N blocks of data is selected (404). In a preferred embodiment, the slice of data comprises blocks of 16 rows by 16 columns of pixel data. A DCT is performed on the block of data (408), and further sub-blocks may be designated, as described in reference to FIG. 3. A threshold for each block of data is again determined (412) at any stage of the process. An average distortion D and an average bit per pixel rate R is also determined (416). Then, using the relationship as described with respect to the coefficient count method, the number of AC coefficients that exceed in magnitude the predetermined threshold (M) is determined (420). A scale factor is then assigned (424) according to the number of AC coefficients exceeding the threshold T.

After the first block of data within a slice is evaluated and assigned a scale factor, the next block of N×N data within the slice is selected (428). The scale factor is incremented (432) from the scale factor of the previous block, and another DCT is performed (436). A MSE is determined between the old and new DCTs (440). An average distortion D and an average bit per pixel rate R corresponding to the quantizer scale factor associated with the MSE rate in step 440 is then determined (444).

The scale factor is then decremented (448) from the scale factor of the previous block, and another DCT is performed (452). The mean square error (MSE) is again determined between the old and new DCTs (456). An average distortion D and an average bit per pixel rate R corresponding to the quantizer scale factor associated with the MSE rate in step 456 is then determined (460). The difference between the two average distortion rates D and the difference between the two bit per pixel rates R are determined (464). Then, the two scale factors are determined (468) by taking the ratio of the change in pixel rate and change in average distortion rate by the following:

$$\text{scale factors} = \left| \frac{\Delta R_i}{\Delta D_i} \right|$$

The scale factor resulting in the maximum absolute ratio is chosen for the current block (472). Then, the cycle repeats for each block of data within the slice (476). After a quantizer is assigned for each block of data within a slice, the next slice of data is selected and the cycle continues (480).

The quantizer scale factor may also be selected on a frame by frame basis. However, frame based rate control generally achieves lower average bit rates than the above described block based rate control. Further, frame based rate control requires more use of buffers, as bit transfers occur on a frame-to-frame basis, as opposed to a block-to-block basis.

In a frame-by-frame quantizer embodiment, a quantization scale factor may be based on the density of various block sized assignments (FIG. 1, block 144). The quantizer scale factor for an entire frame of an image is determined based on a metric that relates to the visual quality of the image. Visual quality is inferred by determining the number of 16×16 blocks and the number of 8×8 blocks for a given frame. That is, if a given frame has more 8×8 blocks than 16×16 blocks, the image is deemed more complex. Accordingly, a more complex image generally requires finer quantization in order to maintain quality. Conversely, if a given frame has more 16×16 blocks than 8×8 blocks, the image is deemed less complex. Accordingly, a lower quantizer scale factor may be used and still maintain visual quality. Thus, for each frame a BSA algorithm is performed, and the scale factor is based on the following:

$$L = \frac{n_{16}}{n_8}, n_8 \neq 0$$

where $n_{16}$ represents the number of 16×16 blocks in a frame, $n_8$ represents the number of 8×8 blocks in a frame, and L represents the ratio that exceeds a threshold. In a preferred embodiment, the threshold is empirically predetermined. The scale factor is then chosen based on the value of L and the number of 8×8 blocks for a given frame.

Alternatively, a frame based quantizer scale factor may be based on the quantizer scale factor of a previous frame (148). In this embodiment, a current frame is compressed using the scale factor of the previous frame, the scale factor corresponding to the scale factor index of the previous frame +1, and the scale factor corresponding to the scale factor index of the previous frame −1. During the compression of the current frame, the actual scale factor is determined from the BSA information as described with respect to the frame-by-frame visual quality method discussed above. The compressed output corresponding to the scale factor closest to the actual scale factor of the current frame is determined, and used along with its corresponding scale factor. That is, $$q(s_n) = \begin{cases} q(s_{n-1} - 1), & \text{if } q(s_{n-1} - 1) \approx q_n \\ q(s_{n-1} + 1), & \text{otherwise} \end{cases}$$

where $q(s_{n-1})$ represents the index of scale factor for the previous frame, $q(s_{n-1}+1)$ represents the candidate index scale factor one above the previous frame, $q(s_{n-1}-1)$ represents the candidate index scale factor one below the previous frame, and $q_n$ represents the actual scale factor for the current frame.

Referring back to FIGS. 1 and 2, the quantized coefficients are provided to a zigzag scan serializer 152. The serializer 152 scans the blocks of quantized coefficients in a zigzag fashion to produce a serialized stream of quantized coefficients. A number of different zigzag scanning patterns, as well as patterns other than zigzag may also be chosen. A preferred technique employs 8×8 block sizes for the zigzag scanning, although other sizes may be employed.

Note that the zigzag scan serializer 152 may be placed either before or after the quantizers 132, 136, 140, 144 or 148. The net results are generally the same.

In any case, the stream of quantized coefficients is provided to a variable length coder 156. The variable length coder 156 may make use of run-length encoding of zeros followed by Huffman encoding. This technique is discussed in detail in aforementioned U.S. Pat. Nos. 5,021,891, 5,107, 345, and 5,452,104, and is summarized herein. A run-length coder would take the quantized coefficients and separate out the zero from the non-zero coefficients. The zero values are referred to as run-length values, and are Huffman encoded. The non-zero values are separately Huffman encoded.

A modified Huffman coding of the quantized coefficients is also possible and is used in the preferred embodiment. Here, after zigzag scanning, a run-length coder will determine the run-length/size pairs within each 8×8 block. These run-length/size pairs are then Huffman encoded.

Huffman codes are designed from either the measured or theoretical statistics of an image. It has been observed that most natural images are made up of flat or relatively slowly varying areas, and busy areas such as object boundaries and high-contrast texture. Huffman coders with frequency-domain transforms such as the DCT exploit these features by assigning more bits to the busy areas and fewer bits to the flat areas. In general, Huffman coders make use of look-up tables to code the run-length and the non-zero values.

Multiple tables are generally used, with 3 tables being preferred in the present invention, although 1 or 2 can be employed, as desired.

The compressed image signal generated by the encoder 104 may be temporarily stored using a buffer 160, and then transmitted to the decoder 112 using the transmission channel 108. The PQR data, which contains the block size assignment information, is also provided to the decoder 112. The decoder 112 comprises a buffer 164 and a variable length decoder 168, which decodes the run-length values and the non-zero values.

The output of the variable length decoder 168 is provided to an inverse zigzag scan serializer 172 that orders the coefficients according to the scan scheme employed. The inverse zigzag scan serializer 172 receives the PQR data to assist in proper ordering of the coefficients into a composite coefficient block.

The composite block is provided using a selector 174 to an inverse quantizer 176, 178, 180, 182, or 184, corresponding to the quantizer used in the encoder 104, for undoing the processing due to the use of the quantizer scale factor and the frequency weighting masks.

The coefficient block is then provided to an IDQT element 186, followed by an IDCT element 186, if the Differential Quad-tree transform had been applied. Otherwise, the coefficient block is provided directly to the IDCT element 190. The IDQT element 186 and the IDCT element 190 inverse transform the coefficients to produce a block of pixel data. The pixel data may then have to be interpolated, converted to RGB form, and then stored for future display.

Accordingly, a system and method is presented for image compression that performs block size assignment based on pixel variance. Variance based block size assignment offers several advantages. Because the Discrete Cosine Transform is performed after block sizes are determined, efficient computation is achieved. The computationally intensive transform need only be performed on the selected blocks. In addition, the block selection process is efficient, as the variance of pixel values is mathematically simple to calculate. Still another advantage of variance based block size assignment is that it is perceptually based. Pixel variance is a measure of the activity in a block, and provides indication of the presence of edges, textures, etc. It tends to capture the details of a block much better than measures such as the average of pixel values. Thus, the variance based scheme of the present invention assigns smaller blocks to regions with more edges and larger blocks to the flatter regions. As a result, outstanding quality may be achieved in the reconstructed images.

Another important advantage is that the block size assignment is made regardless of bit rate and relative to several quantization scale factors, allowing for greater accuracy and clarity in controlling image quality. By allowing for a quality based quantization scale factor, image compression is at a truly variable bit rate. This allows the image compression system to preserve details in all areas that are above just noticeable visibility threshold. Furthermore, the variance based image compression provides a less noticeable degradation of image quality, unlike methods such as Moving Picture Experts Group (MPEG) compression techniques. This is particularly crucial for applications such as in the area of digital cinema.

With digital video in high demand, piracy is a serious threat. Digital watermarking is an important requirement to deter copyright infringement, and loss of revenue. As watermarking is done in areas of an image that are perceptibly significant, variance based block size assignment is a natural candidate for use in watermarking.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

Other features and advantages of the invention are set forth in the following claims.

What we claim as our invention is:

1. A method of compressing a digital image, the image comprising pixel data, the method comprising the acts of:
    reading a block of pixel data;
    generating a block size assignment to divide blocks of pixel into sub-blocks of pixel data, wherein the number of sub-blocks generated varies based on a level of contrast in an image;
    transforming the sub-blocks of pixel data into corresponding frequency domain representations; and
    scaling the frequency domain representations into a stream of data, wherein the act of scaling is based on a quality metric, the quality metric based on human perceptual characteristics of the image; wherein the scaling further quantizes the sub-blocks of pixel data based on a quantization scale factor associated with a contrast level associated with sensitivity of human visual system.

2. The method of claim 1, wherein the act of scaling further comprises the act of providing a frequency weighted mask to said sub-blocks of pixel data, such that a frequency weighting mask provides emphasis to the portions of the image that the human visual system is more sensitive, and provides less emphasis to the portions of the image that the human visual system is less sensitive.

3. The method of claim 1, wherein the act of scaling further comprises the act of quantizing the sub-blocks of pixel data based on a quality of the image.

4. The method of claim 1, wherein the quality metric is a signal to noise ratio.

5. The method of claim 1, wherein the act of transforming performs a Discrete Cosine Transform.

6. The method of claim 1, wherein the act of transforming performs a Discrete Cosine Transform followed by a Differential Quad-tree Transform.

7. The method of claim 5, wherein the act of scaling is on a block by block basis.

8. The method of claim 7, wherein the act of scaling is based on the contrast of the sub-block of pixel data.

9. The method of claim 7, wherein the act of scaling is based on the number of AC coefficients within a sub-block that exceed in magnitude a predetermined threshold.

10. The method of claim 7, wherein the act of scaling is based on a mean square error of the sub-block.

11. The method of claim 5, wherein the act of scaling is on a frame by frame basis.

12. The method of claim 11, wherein the act of scaling is based on the sealing factor of the previous frame.

13. The method of claim 1, wherein the act of generating further comprises the acts of:
    determining a variance of pixel values for said block of pixel data;
    comparing said variance with a threshold;

making a decision to subdivide the block based on a result of the act of comparing;

if said decision is to subdivide said block, then repeating the acts of determining, comparing, and making for each sub-block until a predetermined criteria is satisfied; and designating as the block size assignment each block or sub-block that is not further subdivided.

14. The method of claim 13, wherein the step of making a decision calls for a block to be subdivided if the variance is greater than the threshold.

15. The method of claim 14, wherein the threshold is predetermined.

16. The method of claim 14, wherein the threshold is a function of the mean of pixel values of the block or sub-block being evaluated.

17. The method of claim 14, wherein the threshold changes for each level of subdivision.

18. The method of claim 13, wherein the predetermined criteria for no longer repeating the steps of determining, comparing, and making is based on a pre-selected minimum block size of pixel data.

19. The method of claim 1, wherein the act of scaling the coefficient data into a stream of data further comprises zigzag scanning the coefficient data.

20. The method of claim 19, wherein the act of zigzag scanning is performed using an 8×8 pixel block size.

21. The method of claim 1, wherein the act of scaling further comprises the act of coding the stream of data into a serialized stream of data in preparation for transmission.

22. The method of claim 21, wherein the act of coding comprises a Huffman coder.

23. The method of claim 22, wherein the Huffman coder employs multiple look-up tables to code run-length and non-zero values.

24. The method of claim 23, wherein there are three look-up tables.

25. The method of claim 1, wherein the act of generating is based on the perceptual characteristics of the image.

26. A quality based image compression system for compressing pixel data, the system comprising:

block size assignment means to divide blocks of pixel into sub-blocks of pixel data, wherein the number of sub-blocks generated varies based on a level of contrast in an image;

transform means to transform the sub-blocks of pixel data into corresponding frequency domain representations; and scaling means to scale the frequency domain representations into a stream of data, wherein the scaling means is based on a quality metric, the quality metric based on human perceptual characteristics of the image; wherein the scaling means further comprises quantizing means to quantize the sub-blocks of pixel data based on a quantization scale factor associated with a contrast level associated with sensitivity of human visual system.

27. The system of claim 26, wherein the scaling means further comprises a frequency weighted masking means to said sub-blocks of pixel data, such that the frequency weighted mask provides emphasis to the portions of the image that the human visual system is more sensitive, and provides less emphasis to the portions of the image that the human visual system is less sensitive.

28. The system of claim 26, wherein the scaling means further comprises a quantizer to quantize the sub-blocks of pixel data based on a quality of the image.

29. The system of claim 26, wherein the quality metric is a signal to noise ratio.

30. The system of claim 26, wherein the transform means performs a Discrete Cosine Transform.

31. The system of claim 26, wherein the transform means performs a Discrete Cosine Transform followed by a Differential Quad-tree Transform.

32. The system of claim 30, wherein the scaling means scales the data on a block by block basis.

33. The system of claim 32, wherein the scaling means is based on the contrast of the sub-block of pixel data.

34. The system of claim 32, wherein the scaling means is based on the number of AC coefficients within a sub-block that exceed in magnitude a predetermined threshold.

35. The system of claim 32, wherein the scaling means is based on a mean square error of the sub-block.

36. The system of claim 26, wherein the scaling means is on a frame by frame basis.

37. The system of claim 35, wherein the scaling means is based on the scaling factor of the previous frame.

38. The system of claim 26, wherein the block size assignment means determines a variance of pixel values for the block of pixel data; compares the variance with a threshold; makes a decision to subdivide the block based on a result of the comparing; wherein if the decision is to subdivide the block, then repeats the determination of variance, the comparison with a threshold, and the decision to subdivide for each subdivided block until a predetermined criteria is satisfied; and designates as the block size assignment each block or sub-block that is not further subdivided.

39. The system of claim 38, wherein the decision to subdivide calls for a block to be subdivided if the variance is greater than the threshold.

40. The system of claim 39, wherein the threshold is predetermined.

41. The system of claim 39, wherein the threshold is a function of the mean of pixel values of the block or sub-block being evaluated.

42. The system of claim 39, wherein the threshold changes for each level of subdivision.

43. The system of claim 38, wherein the predetermined criteria for no longer subdividing is based on a pre-selected minimum block size of pixel data.

44. The system of claim 26, wherein the scaling further comprises a zigzag scanner.

45. The system of claim 44, wherein the zigzag scanner employs an 8×8 pixel block size for the zigzag scanner.

46. The system of claim 45, wherein the scaling means further comprises a coder to code the stream of data into a serialized stream of data in preparation for transmission.

47. The system of claim 46, wherein the coder is a Huffman coder.

48. The system of claim 47, wherein the Huffman coder employs multiple look-up tables to code run-length and non-zero values.

49. The system of claim 48, wherein there are three look-up tables.

50. The method of claim 1, wherein the quality metric is a function of a bit per pixel rate.

51. The method of claim 1, wherein the quality metric is a function of an average distortion rate.

* * * * *